(12) United States Patent
Gschwind-Schilling

(10) Patent No.: US 10,594,410 B2
(45) Date of Patent: Mar. 17, 2020

(54) METHOD AND DEVICE FOR ASCERTAINING A USEFUL SIGNAL

(71) Applicant: Robert Bosch GmbH, Stuttgart (DE)

(72) Inventor: Rainer Gschwind-Schilling, Rutesheim (DE)

(73) Assignee: Robert Bosch GmbH, Stuttgart (DE)

(*) Notice: Subject to any disclaimer, the term of this patent is extended or adjusted under 35 U.S.C. 154(b) by 303 days.

(21) Appl. No.: 15/160,728

(22) Filed: May 20, 2016

(65) Prior Publication Data

US 2016/0360434 A1    Dec. 8, 2016

(30) Foreign Application Priority Data

Jun. 2, 2015   (DE) .................. 10 2015 210 102

(51) Int. Cl.
*H03L 7/08*  (2006.01)
*H03L 7/16*  (2006.01)
*H04B 15/02* (2006.01)

(52) U.S. Cl.
CPC ........................ *H04B 15/02* (2013.01)

(58) Field of Classification Search
CPC .......... H04B 15/06; H04B 1/10; H04B 15/02
See application file for complete search history.

(56) References Cited

U.S. PATENT DOCUMENTS

| 4,847,860 A * | 7/1989 | Robert ................. H01Q 3/2652 375/136 |
| 2009/0079367 A1* | 3/2009 | Crouse ............... H05B 41/2828 315/307 |
| 2013/0324064 A1* | 12/2013 | Clement ................ H04B 15/06 455/226.3 |

* cited by examiner

*Primary Examiner* — Alesa Allgood
(74) *Attorney, Agent, or Firm* — Norton Rose Fulbright US LLP; Gerard Messina

(57) ABSTRACT

A method for ascertaining a useful signal. The method includes a sampling a read-in sensor signal using a first sampling frequency in order to obtain a first sampled signal and sampling the sensor signal using a second sampling frequency in order to obtain a second sampled signal, the first and the second sampling frequency differing from one another. The method further includes a step of detecting the useful signal as signal components of the first and the second sampled signal, the signal components of the first and the second sampled signal having the same frequency within a tolerance range.

7 Claims, 2 Drawing Sheets

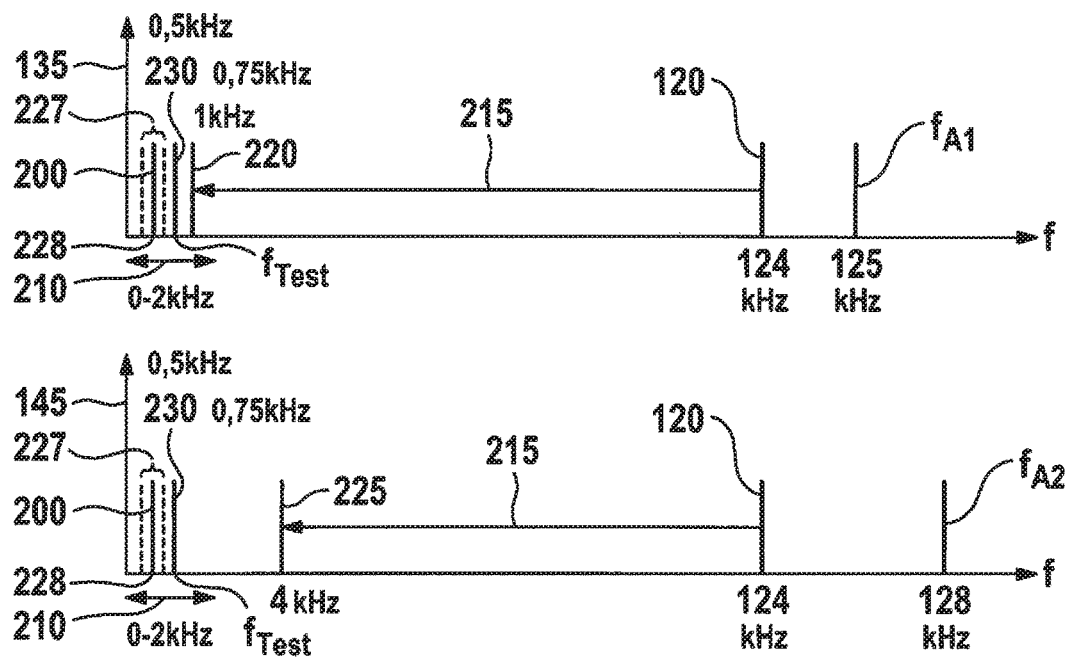
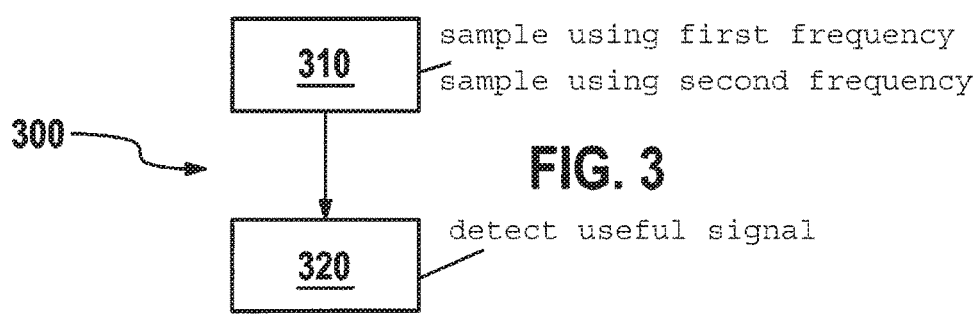

METHOD AND DEVICE FOR ASCERTAINING A USEFUL SIGNAL

CROSS REFERENCE

The present application claims the benefit under 35 U.S.C. § 119 of German Patent Application DE 102015210102.9 filed on Jun. 2, 2015, which is expressly incorporated herein by reference in its entirety.

FIELD

The present invention is directed to a device or a method for ascertaining a useful signal. A computer program is also a subject matter of the present invention.

BACKGROUND INFORMATION

Digitizing analog signals using analog-to-digital converters is widespread. The technique previously utilized has a general disadvantage in that it may automatically generate "valid signals" in the event of interruptions of the power supply, ground, or a useful signal.

This faulty behavior will be explained on the basis of a micromechanical sensor. This is assumed to be a sensor, which is capable of evaluating acceleration signals up to 2 kHz. The analog-to-digital converter (ADC) utilized internally uses a sampling frequency of 125 kHz. If electromagnetic interferences (EMC interferences) now act upon the ADC, it may be disturbed. Interferences having frequencies approaching the harmonic of internally utilized frequencies, e.g., an interference of 124 kHz or 126 kHz at a sampling frequency of 125 kHz, are critical, in particular. These two frequencies have a frequency spacing of 1 kHz from the sampling frequency of the sensor considered by way of example. This then results in "pseudo acceleration values" of 1 kHz in each case as a result of mixing effects (these effects are intentionally utilized in the case of high-frequency mixing in radio receivers). These pseudosignals cannot be subsequently separated from real signals. This effect is limited not only to the first harmonic, but also theoretically affects all harmonics.

SUMMARY

In accordance with example embodiments of the present invention, a method, device and computer program for ascertaining a useful signal are provided which include, e.g., the follwing:

sampling a read-in sensor signal using a first sampling frequency in order to obtain a first sampled signal and sampling the sensor signal using a second sampling frequency in order to obtain a second sampled signal, the first and the second sampling frequency differing from one another; and identifying the useful signal as signal components of the first and the second sampled signal, the signal components of the first and the second sampled signal having the same frequency within a tolerance range.

A useful signal may be understood to be a signal containing a piece of useful information, which is intended to be extracted from the signal and/or further processed. For example, a signal from a sensor may be understood to be a useful signal. A signal component may be understood to be a component of the signal within a certain frequency range or at a certain frequency. A tolerance range may be understood to be a range, for example, about a frequency which deviates from this frequency by at most 20 percent, in particular by at most 10 percent. In this regard, the useful signal may be understood to be the signal component of the first and/or the second sampled signal that is contained in both sampled signals within a frequency range of 20 percent, for example, about a certain frequency.

In accordance with example embodiments of the present invention, in the case of sampling the useful signal using different sampling frequencies in order to obtain different sampled signals, the useful signal is contained in each of the sampled signals at the (correct) frequency, where the faulty signals in the individual sampled signals obtained as a result of the interfering frequency signals are mixed with the sampling frequency occur at different frequencies. A typical property of frequency mixing is therefore utilized in order to identify the interference signals. This is carried out at the expense of a two-fold sampling, which, in the case of conventional, reasonably priced signal processing units, will not substantially increase costs, but will significantly increase the error detection.

A specific embodiment of the approach described in detail below is particularly advantageous in which a first and a second sampling frequency are used in the sampling step, which are greater than twice a frequency of the sensor signal and/or a maximum detection frequency in the detection step. Such a specific embodiment offers the advantage of a highly precise and simple detection of interference signal components, so that the useful signal is highly precisely ascertainable.

According to a further specific embodiment of the approach presented here, the useful signal may be detected in the detection step when the signal components of the first and the second sampled signal have the same amplitude within a tolerance range. Such a specific embodiment offers the advantage that the useful signal may be unequivocally identified and detected as compared to a possible interference signal. In this case, advantage may be taken of the fact that interference signals usually have different amplitudes at different frequencies, so that it is highly likely that the useful signal to be ascertained is the only signal to be processed that has the same signal amplitudes in both sampled signals.

In a further specific embodiment of the approach presented here, the method includes a step of determining an interference signal and/or a parameter of an interference signal, the interference signal and/or the parameter of an interference signal being determined using the first and the second sampling frequency, the frequency of the signal components detected as the useful signal, and a first interference signal component contained in the first sampled signal and a second interference signal component contained in the second sampled signal. Such a specific embodiment offers the advantage of being able to ascertain a further piece of information using the values that are already available, which may be used, for example, for a subsequent signal processing instruction for error compensation.

Furthermore, a specific embodiment of the approach presented here is advantageous in which the method includes a step of applying a test signal to the sensor signal, the test signal having a test signal frequency, which differs from a frequency of the sensor signal, in particular, the useful signal being detected in the detection step when a test signal component is detected in the first and the second sampled signal at a frequency assigned to the test signal in each case. Such a test signal component assigned to each test signal may be expected at a frequency that is ascertainable taking into account the sampling frequency (of the particular sampled signal under consideration) and the test signal frequency. Such a specific embodiment offers the advantage that the frequency of the test signal (test signal frequency) is known, so that the correct function of the method (even if interference signals having unknown frequencies occur) may be easily checked. Analogously, in another specific embodiment of the approach presented here, a step of acting upon the sensor signal may be carried out using an interference signal, in particular, the method including a step of checking the correct function of the method, the checking step being successful when a frequency component corresponding to the frequency of the interference signal is contained in the first and the second sampled signal. In addition, an error-free function of the method for ascertaining the useful signal may be checked with the aid of such a specific embodiment.

According to a specific embodiment of the approach presented here that may be implemented in a technically particularly simple manner, in the application step, a supply voltage and/or a supply current of a device carrying out the method is filtered, a frequency component of the supply voltage and/or the supply current that deviates from the frequency of the useful signal being applied in the filtering step to the sensor signal as the interference signal. Such a specific embodiment offers the advantage that a required filter for filtering interferences on energy supply lines of the device may be utilized for an additional function in order to carry out the approach presented here, so that only very slight changes in existing circuit topologies are required in order to implement the approach presented here.

Furthermore, an error-free implementation of the filtering step may also be detected in the checking step when a frequency component of the supply voltage and/or the supply current is detectable at a predefined filter frequency in the first and/or the second sampled signal. Such a specific embodiment offers the advantage that the frequency signal component may be unequivocally detected at the predefined filter frequency and, therefore, the correct functioning of the approach presented here may be very easily checked.

The useful signal may be very reliably ascertained if, according to one specific embodiment of the approach presented here, signals from two separate circuit assemblies are used as the first sampled signal and the second sampled signal in the sampling step. In this case, the two circuit assemblies may be built on separate circuit boards. Such a separation in the sampling offers the advantage, for example, that the likelihood is very low that a signal component in the first sampled signal caused by a hardware error in one of the circuit assemblies will affect the corresponding signal components in the second sampled signal, so that a more robust detection of the useful signal becomes possible.

The method presented here may be implemented, for example, in software or hardware or in a hybrid form of software and hardware, for example, in a control unit.

The present invention furthermore provides a device, which is designed for carrying out, controlling, or implementing the steps of a variant of a method presented here in corresponding units. The object of the present invention may also be rapidly and efficiently achieved with the aid of this embodiment variant of the present invention in the form of a device.

In the present case, a device may be understood to be an electrical device that processes sensor signals and, as a function thereof, outputs control and/or data signals. The device may include an interface, which may be in the form of hardware and/or software. In the case of an embodiment as hardware, the interfaces may be part of a so-called system ASIC, for example, which contains highly diverse functions of the device. It is also possible, however, that the interfaces are standalone, integrated circuits or are formed, at least in part, from discrete components. In the case of an embodiment as software, the interfaces may be software modules, which are present, for example, on a microcontroller in addition to other software modules.

In addition, a computer program product or a computer program including program code is advantageous, which may be stored on a machine-readable carrier or memory medium such as a semiconductor memory, a hard drive memory or an optical memory, and which may be used for carrying out, implementing, and/or controlling the steps of the method according to one of the above-described specific embodiments, in particular when the program product or program is carried out on a computer or a device.

Exemplary embodiments of the present invention are represented in the figures and are described in greater detail below.

BRIEF DESCRIPTION OF THE DRAWINGS

FIG. 2 shows diagrams of signal components for ascertaining the useful signal according to one exemplary embodiment.

FIG. 3 shows a flow chart of a method according to one exemplary embodiment.

BACKGROUND INFORMATION

Figure 1:
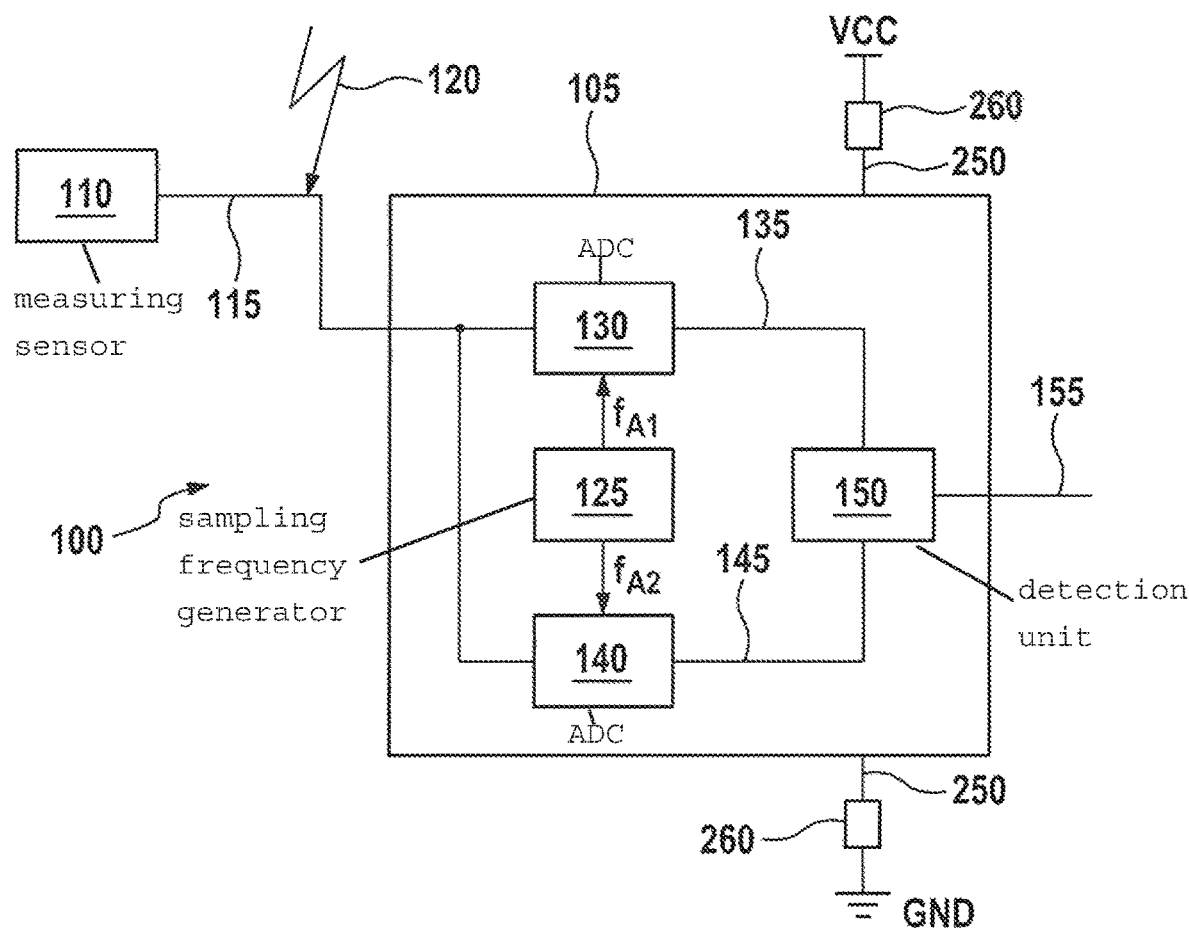
FIG. 1 shows a block diagram of a measuring system including a device according to one exemplary embodiment.

In the following description of favorable exemplary embodiments of the present invention, identical or similar reference numerals are used for the similarly functioning elements represented in the different figures, a repeated description of these elements being dispensed with.

FIG. 1 shows a block diagram of a measuring system 100 including a device 105 according to one exemplary embodiment of the present invention. Measuring system 100 includes a measuring sensor 110, for example, in the form of a micromechanical acceleration sensor, which provides a measuring signal 115. This measuring signal 115 is often interfered with during the transmission to device 105 by parasitic couplings such as an electromagnetic coupling of an interference signal 120, however, so that during the ascertainment of the pure measuring signal 115 a part of interference signal 120 possibly mixed into the frequency range to be evaluated by device 105 is wrongly perceived as part of measuring signal 115 and, therefore, the measuring signal may not be precisely detected. This may have considerable disadvantages in some cases or may entirely prevent the use of ascertained measuring signal 115 for an intended purpose when measuring signal 115 is used, for example, for activating passenger protection systems in a vehicle.

In order to now enable the immunity to interference to be optimized when detecting measuring signal 115, according to the present invention, a sampling frequency generator 125 is utilized in device 105, which provides a first sampling frequency $f_{A1}$ and a second sampling frequency $f_{A2}$, which differs from the first sampling frequency. Measuring signal 115 interfered with by interference signal 120 is sampled by a first analog-to-digital converter 130 (ADC) using first sampling frequency $f_{A1}$ in order to obtain a first sampled signal 135. In a second analog-to-digital converter 140, measuring signal 115 interfered with by interference signal 120 is sampled using second sampling frequency $f_{A2}$ in order to obtain a second sampled signal 145.

FIG. 2 shows diagrams of signal components 200 of first sampled signal 135 and second sampled signal 145 for ascertaining useful signal 155. In the diagrams, the amplitudes of first sampled signal 135 and second sampled signal 145 are plotted against the frequency. The exemplary embodiment represented in FIG. 2 is based on a measuring signal 115 (an acceleration signal, for example, in this case) having a frequency of 0.5 kHz, an interference signal of an EMC interference having a frequency of 124 kHz, a first sampling frequency of $f_{A1}$=125 kHz, and a second sampling frequency of $f_{A2}$=128 kHz. In this case, it is apparent that a signal component 200 occurs in both first and second sampled signals 135 and 145 in frequency range 210 (from 0 to 2 kHz) to be evaluated by detection unit 150, at the frequency of 0.5 kHz of actual measuring signal 115, whereas, in first sampled signal 135, a first false signal (pseudosignal) 220 of frequency 1 kHz occurs as a result of a mixing effect 215 of interference signal 120 of frequency 124 kHz at first sampling frequency $f_{A1}$, and, in second sampled signal 145, a second false signal (pseudosignal) 225 of frequency 4 kHz occurs as a result of a mixing effect 215 of interference signal 120 of frequency 124 kHz at second sampling frequency $f_{A2}$. First and second false signal 220 and 225, respectively, are therefore interference signals, which are not to be taken into account in the detection of measuring signal 115 as useful signal 155. According to the even more detailed description below, useful signal 155 is now detected in a detection unit 150 as that part of measuring signal 115 superimposed by interference signal 120 that has the same frequency 228 within a tolerance range 227 (of 10%, for example).

It is particularly advantageous when the spacing between the two ADC frequencies $f_{A1}$ and $f_{A2}$ is greater than twice the maximum signal frequency to be processed. An interfering frequency located exactly between the two ADC frequencies $f_{A1}$ and $f_{A2}$ is therefore prevented from generating a "valid signal."

In detection unit 150, it may now be detected, as a result of the evaluation of first sampled signal 135 and second sampled signal 145, that a signal component 200 is contained in each of these sampled signals, in the range of 0.5 kHz (allowing for a 10% deviation, for example, from this value of 0.5 kHz), whereas a further signal component is contained at a frequency of 1 kHz only in first sampled signal 135 in frequency range 210 to be evaluated, which therefore cannot originate from measuring signal 115. Component 225 in the second sampled signal, which has been down-converted from interference signal 120, is outside frequency range 210 to be evaluated, on the one hand, and does not have a corresponding counterpart in first sampled signal 135 and, therefore, may be detected as pseudosignal 225 generated as a result of mixing. Signal components 200 in first and second sampled signal 135 and 145, respectively, are therefore recognizable as signal components of a real signal, so that useful signal 155 may be output by detection unit 150 as corresponding signal components 200.

It is also possible that a frequency of interference signal 120 is identified on the basis of the knowledge of first and second sampling frequency $f_{A1}$ and $f_{A2}$, respectively, and first and second pseudosignal 220 and 225, respectively, so that this information may also be output, for example, by detection unit 150 and may be utilized for avoiding further interferences by interference signal 120 or for its compensation.

In other words, the approach presented here makes it possible to optimize the immunity to interference when evaluating signals using ADCs (analog-to-digital converters) or in the case of micromechanical sensors. Such pseudosignals 220 and 225 may be identified by using two ADC units 130 and 140, respectively, having different processing frequencies $f_{A1}$ and $f_{A2}$, respectively. Only real acceleration signals, of the type which result in signal components 200, yield identical values in the case of both ADCs 130 and 140. As a result of the comparison of the two ADC outputs or signals 135 and 145, real acceleration values 115 and pseudosignals 220 and 225, may be cleanly detected and processed.

In addition, an interference by a test signal 230 (for example, having a frequency of 0.75 kHz) could also be intentionally applied during regular operation and, therefore, both ADC units 130 and 140 could be checked for the correct functionality. This test signal 230 is then detected as intentionally generated test pseudosignal 230 and is then checked for correctness. Therefore, if a signal component is present in first sampled signal 135 and second sampled signal 145 at the frequency 0.75 kHz, it may be ensured that sampling units 130 and 140 function correctly.

Regular interferences on supply line 250 (see FIG. 1) may also be used as test signal 230, e.g., when a DC/DC or AC/DC converter operates at an appropriate frequency, electric filters 260 of supply voltage 250 may play less of a role, so that a certain portion of known interferences is on supply line 250 and may then be used as the test signal.

Using this special method, supply filter 260 which is used may even be simultaneously checked for correct function. Misassemblies/damaged components (keyword: FMEA) in the case of assembled circuit boards result in other filter characteristics and then generate a different test signal 230 or test result in sampled signals 135 and 145.

A further embodiment is the utilization (not shown in FIG. 1) of a second sensor element, which then runs together with the second ADC unit completely at other drive/processing frequencies.

The embodiment described with reference to FIG. 1 may be considered to be optimal in terms of cost, since, due to the high level of integration of the ASIC/silicon processes used today, an additional ADC unit does not result in notable additional costs (as compared to other optimization possibilities for reducing EMC interferences in ADCs).

FIG. 3 shows a flow chart of a method 300 for ascertaining a useful signal according to one exemplary embodiment of the present invention. Method 300 includes a step 310 of sampling a read-in sensor signal using a first sampling frequency in order to obtain a first sampling signal and sampling the sensor signal using a second sampling frequency in order to obtain a second sampling signal, the first and the second sampling frequency differing from one another. Furthermore, method 300 includes a step 320 of detecting the useful signal as signal components of the first and the second sampled signal, the signal components of the first and the second sampled signal having the same frequency within a tolerance range.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

What is claimed is:

1. A method for ascertaining a sensor signal, the method comprising:
    sampling, via a first analog-to-digital converter, a read-in sensor signal using a first sampling frequency to obtain a first sampled signal;
    sampling, via a second analog-to-digital converter, the read-in sensor signal using a second sampling frequency to obtain a second sampled signal, the first and the second sampling frequency differing from one another;
    detecting the sensor signal as signal components of the first and the second sampled signal, the signal components of the first and the second sampled signal having the same frequency within a tolerance range;
    generating a sensor signal in response to filtering an interfering signal which is located between the first sampling frequency and the second sampling frequency;
    outputting another sensor signal that excludes the interfering signal; and
    applying a test signal to the sensor signal, the test signal having a test signal frequency, which differs from a frequency of the sensor signal, the sensor signal being detected in the detection step when a test signal component is detected in the first and the second sampled signal at a frequency assigned to the test signal;
    wherein, in the applying, filtering at least one of a supply voltage and a supply current, so as to filter external disturbances, including interfering signals and/or interfering frequencies, and
    wherein an error-free implementation of the filtering is detected when a frequency component of the at least one of the supply voltage and the supply current is detectable in a predefined filter frequency in at least one of the first and the second sampled signal.

2. The method as recited in claim 1, wherein the first sampling frequency and the second sampling frequency, which are used in the sampling step, are greater than twice a maximum detection frequency in the detection step.

3. The method as recited in claim 1, wherein the sensor signal is detected in the detection step when the signal components of the first and the second sampled signal have the same amplitude within a tolerance range.

4. The method as recited in claim 1, further comprising:
    determining at least one of an interference signal and a parameter of an interference signal, the at least one of the interference signal and the parameter of an interference signal being determined using the first and the second sampling frequency, a frequency of the signal components detected as the sensor signal, and a first interference signal component contained in the first sampled signal and a second interference signal component contained in the second sampled signal.

5. The method as recited in claim 1, wherein signals from two separate circuit assemblies are used as the first sampled signal and the second sampled signal in the sampling step.

6. A device for ascertaining a sensor signal,
    an ascertaining device configured to perform the following:
        sampling, via a first analog-to-digital converter, a read-in sensor signal using a first sampling frequency to obtain a first sampled signal;
        sampling, via a second analog-to-digital converter, the read-in sensor signal using a second sampling frequency to obtain a second sampled signal, the first and the second sampling frequency differing from one another;
        detecting the sensor signal as signal components of the first and the second sampled signal, the signal components of the first and the second sampled signal having the same frequency within a tolerance range;
        generating a sensor signal in response to filtering an interfering signal located between the first sampling frequency and the second sampling frequency;
        outputting another sensor signal that excludes the interfering signal; and
        applying a test signal to the sensor signal, the test signal having a test signal frequency, which differs from a frequency of the sensor signal, the sensor signal being detected in the detection step when a test signal component is detected in the first and the second sampled signal at a frequency assigned to the test signal;
        wherein, in the applying, filtering at least one of a supply voltage and a supply current, so as to filter external disturbances, including interfering signals and/or interfering frequencies, and
        wherein an error-free implementation of the filtering is detected when a frequency component of the at least one of the supply voltage and the supply current is detectable in a predefined filter frequency in at least one of the first and the second sampled signal.

7. A non-transitory machine-readable memory medium storing a computer program, which is executable by a processor, comprising:
    a program code arrangement having program code for ascertaining a sensor signal by performing the following:
        sampling, via a first analog-to-digital converter, a read-in sensor signal using a first sampling frequency to obtain a first sampled signal;
        sampling, via a second analog-to-digital converter, the read-in sensor signal using a second sampling frequency to obtain a second sampled signal, the first and the second sampling frequency differing from one another;
        detecting the sensor signal as signal components of the first and the second sampled signal, the signal components of the first and the second sampled signal having the same frequency within a tolerance range;
        generating a sensor signal in response to filtering an interfering signal, located between the first sampling frequency and the second sampling frequency, and
        outputting another sensor signal that excludes the interfering signal; and
        applying a test signal to the sensor signal, the test signal having a test signal frequency, which differs from a frequency of the sensor signal, the sensor signal being detected in the detection step when a test signal component is detected in the first and the second sampled signal at a frequency assigned to the test signal;
        wherein, in the applying, filtering at least one of a supply voltage and a supply current, so as to filter external disturbances, including interfering signals and/or interfering frequencies, and
        wherein an error-free implementation of the filtering is detected when a frequency component of the at least one of the supply voltage and the supply current is detectable in a predefined filter frequency in at least one of the first and the second sampled signal.

* * * * *